Aug. 26, 1969   ISAO MATSUSHIMA   3,462,810
CONTINUOUS POTTERY FORMING MACHINE OF TABLEWARES
Filed Jan. 3, 1967                                    3 Sheets-Sheet 1

INVENTOR.
Isao Matsushima
BY
Stevens, Davis, Miller & Mosher
ATTORNEYS

Aug. 26, 1969  ISAO MATSUSHIMA  3,462,810
CONTINUOUS POTTERY FORMING MACHINE OF TABLEWARES
Filed Jan. 3, 1967  3 Sheets-Sheet 2

INVENTOR.
Isao Matsushima
BY
Stevens, Davis, Miller & Mosher
ATTORNEYS

Aug. 26, 1969    ISAO MATSUSHIMA    3,462,810
CONTINUOUS POTTERY FORMING MACHINE OF TABLEWARES
Filed Jan. 3, 1967    3 Sheets-Sheet 3

INVENTOR.
Isao Matsushima
BY
Stevens, Davis, Miller & Mosher
ATTORNEYS

United States Patent Office 3,462,810
Patented Aug. 26, 1969

3,462,810
CONTINUOUS POTTERY FORMING MACHINE
OF TABLEWARES
Isao Matsushima, Nagoya-shi, Japan, assignor to Nippon Toki Kabushiki Kaisha, Nagoya-shi, Japan, a corporation of Japan
Filed Jan. 3, 1967, Ser. No. 606,905
Int. Cl. B28b 15/00
U.S. Cl. 25—2    3 Claims

ABSTRACT OF THE DISCLOSURE

This disclosure relates to a continuous pottery forming machine of tablewares, and more particularly to a continuous pottery forming machine of plates, dishes, bowls and other pottery tablewares whereby, in the shaping of greenwares, predetermined amounts of clay are fed to molds, shaped by former tools, and then are dried, unloaded, edge-toward and piled in an entirely automatic operation.

---

It is an object of the present invention to realize the continuous manufacture of pottery tablewares, in mass production, with a machine of a reduced floor space required which provides greenwares of uniform quality and configuration.

The present invention relates to a continuous pottery forming machine of pottery tablewares comprising a deairing machine for mixing, kneading, deairing, and extruding clay into a cylindrical form, first conveying means for transferring the extruded clay columns, means for cutting the clay columns to rolls of clay of a predetermined length, second conveying means for transferring the rolls of clay, means disposed above the second conveying means for forming the rolls of clay into the greenwares, and means for drying the greenwares.

The invention further relates to a continuous pottery forming machine of tablewares comprising a deairing machine for mixing, kneading, deairing, and extruding material clay into a cylindrical form, first conveying means for transferring the extruded clay columns, means for slicing the clay columns to rolls of clay of a predetermined length, second conveying means for transferring the rolls of clay, means disposed above the second conveying means for spreading the rolls of clay to bats, third conveying means for receiving and transferring the spreaded bats, means disposed above the third conveying means for forming the spreaded bats into greenwares, first drying means for primarily drying greenwares, fourth conveying means having ring-shaped seats for receiving the primarily dried greenwares and for transferring the same, second drying means for secondarily drying the greenwares on the ring-shaped seats, means disposed above the fourth conveying means for sucking and revolving the secondary dried greenwares, fifth conveying means disposed over the sucking and revolving means for sucking and transfering the greenwares, the finishing means disposed under the fifth conveying means and means for piling the finished greenwares.

Other objects and advantages of the present invention will become apparent from the following detailed description taken in conjunction with the accompanying drawings showing preferred embodiments thereof. In the drawings.

Figure 1:
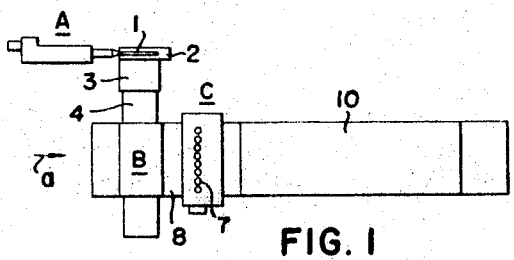
FIG. 1 is a plan view of an embodiment of the invention.
Figure 2:
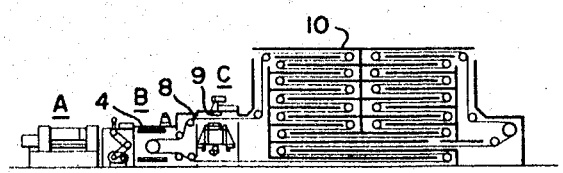
FIG. 2 is a side elevation, in longitudinal section, of the above embodiment.
Figure 3:
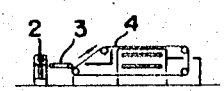
FIG. 3 is a front elevation of the embodiment as seen from the direction indicated by an arrow $a$ in FIG. 1.
Figure 4:
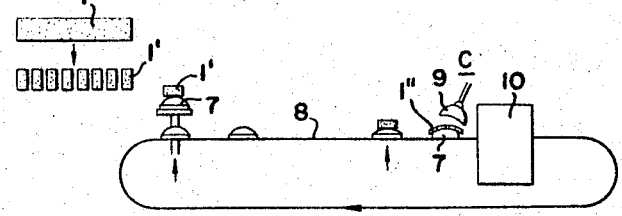
FIG. 4 is a schematic view of the above embodiments.
Figure 5:
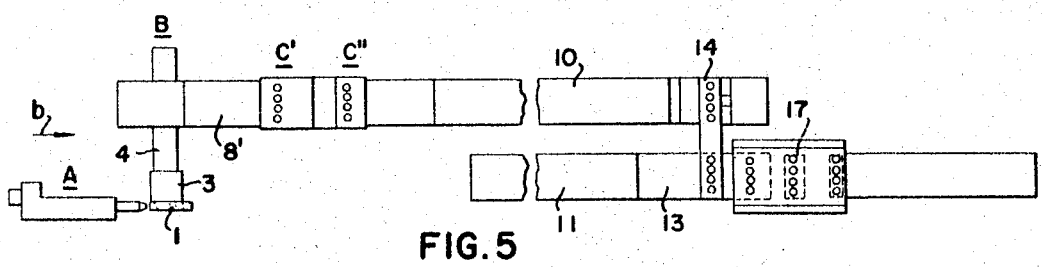
FIG. 5 is a plan view of another embodiment of the invention.
Figure 6:
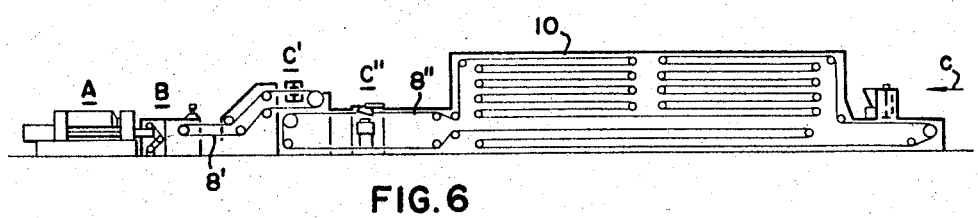
FIG. 6 is a side elevation in longitudinal section, of a part of the above embodiment.
Figure 7:
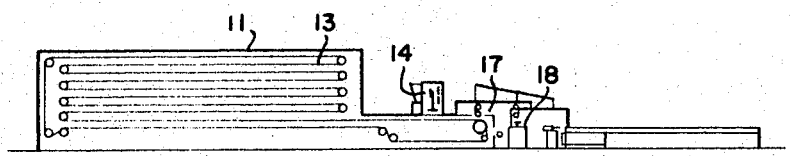
FIG. 7 is a side elevation in longitudinal section, of another part of the above embodiment.
Figure 8:
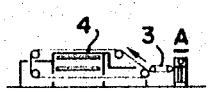
FIG. 8 is a front elevation of the embodiments as seen from the direction indicated by an arrow $b$ in FIG. 5.
Figure 9:
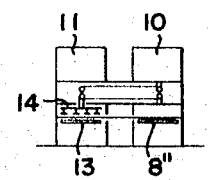
FIG. 9 is a front elevation as seen from the direction of an arrow $c$ in FIG. 6.
Figure 10:
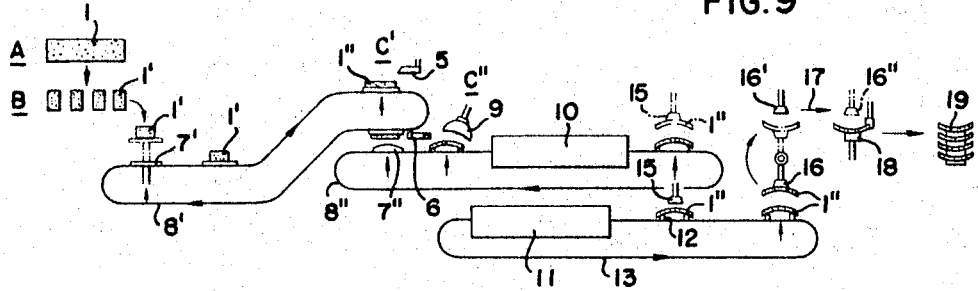
FIG. 10 is a schematic view of the above embodiment.

Referring specifically to FIGS. 1 through 4, the first embodiment of the present invention will be described hereunder.

Indicated generally at A is a deairing machine of well known type which can mix, knead, and extrude clay with a screw and deair the clay by a vacuum means. Clay is extruded from the deairing machine A into the form of a column 1. Along the extruding direction of the deairing machine A a receiving trough 2 is disposed in such manner that, when a certain length of clay column 1 is extruded from the deairing machine A, a limit switch is actuated thereby to cut the clay column and to turn the trough 2 sidewise. On a side of the trough 2, there is provided a table 3, adjacent to which a conveyor 4 is stretched which can move in the direction at a right angle to the direction into which the clay column 1 is extruded.

The conveyor 4 is capable of moving and stopping intermittently and is provided about midway with a cutter B for slicing the extruded clay. The cutter B can push forth in the axial direction the clay column 1 conveyed thereto by the conveyor 4 and then slice simultaneously the column into rolls of clay of predetermined amounts, each of which is enough to form a desired greenware. The cutter B will be described in further details hereinafter.

Below the cutter B, another conveyor 8 is arranged which moves and stops intermittently in the direction normal to that of the conveyor 4 and which supports molds 7 for forming the rolls of clay. In the drawings is shown a mold arrangement of a multi-head type, e.g. of mold 7 arranged in eight rows. Accordingly, clay is sliced by the cutter B simultaneously in eight rows of rolls of clay, and the rolls of clay 1' so sliced off are fed to the molds 7 on the conveyor 8.

In the position C ahead of the cutter B above the conveyor 8 a forming station is arranged. In the forming station C, the molds 7 supported by the conveyor 8 are elevated and revolved. Also, in this forming station C are disposed former tools 9 above the molds 7.

In the further advanced position ahead of the forming station C above the conveyor 8, a dryer 10 is arranged, into which the conveyor 8 can move in. Inside the dryer 10 a passage for drying air is provided horizontally in zigzag fashion. The conveyor 8 also zigzags along the passage but in the direction reverse to that of drying air therethrough.

The operation of the first embodiment will be explained hereunder.

Clay is extruded from the deairing machine A into the form of a column 1 of a predetermined length, which is then fed to the receiving trough 2, and the trough tumbles to feed the column onto the table 3. Next, the clay column 1 is transferred by a conveyor 4 which moves intermittently, and is sliced by the cutter B to rolls of clay of a predetermined length while the conveyor 4 is intermittently stopped. The rolls of clay 1' so formed are fed to molds 7 which elevated from the conveyor 8 stopped.

Then, by means of the conveyor 8 the rolls of clay 1' on the molds 7 are transferred to the forming station C, where the molds 7 are elevated and revolved while the conveyor 8 is stopped, and the rolls of clay 1' are spread and formed by former tools 9.

The greenwares 1" so formed in the forming station C are transferred by the conveyor 8 into the dryer 10. After drying, the greenwares are led to the ensuing processes such as finishing process.

The directions of the conveyors and other components may suitably be modified.

Now the second embodiment of the invention will be illustrated by reference to FIGS. 5 through 10.

The parts of the second embodiment in FIGS. 5 through 10 which correspond to those of the first embodiment shown in FIGS. 1 to 4 are designated by like symbols or numerals. As will be seen from this, the parts of the second embodiment indicated by letters A through C and numerals 1 through 10 have substantially the same constructions as those of the first embodiment. However, in contrast to the conveyor 8 in the first embodiment, the conveying means in the second embodiment consists of two rows of conveyors, which are therefore designated as 8' and 8". Accordingly, the disk and mold supported by the conveyors 8', 8" are indicated, respectively, by numerals 7', 7". The disk 7' is supported by the conveyor 8' and can be elevated at the position of the cutter B.

At the position C' of the conveyor 8' which is further ahead of the cutting station B, spreading tools 5 are arranged above the disks 7'. In the further advanced point where the conveyor 8' turns back, cutters 6 are provided on one side of the disks 7'. Below this point, one end of the conveyor 8" is positioned. In the advanced position C" of the conveyor 8", former tools 9 are disposed above the molds 7" on the conveyor 8". In the further advanced point of the conveyor 8" ahead of the forming station C", a dryer 10 is arranged.

In this second embodiment of the invention, a second dryer 11 is provided parallelly with the said first dryer 10, and a conveyor 13 equipped with ring-shaped seats 12 and which is capable of moving intermittently is arranged inside the second dryer 11. A carriage 14 is provided which reciprocates between the conveyor 8" at the outlet of the first dryer 10 and a conveyor 13 at the inlet of the second dryer 11. The carriage 14 is equipped with sucking means 15 which support by suction the greenwares 1" formed on the molds 7". Above a suitable point of the conveyor 13 coming out of the second dryer 11, rotatable sucking means 16 are disposed. Over the rotatable sucking means 16 are disposed the transferring means 17, provided with sucking means 16' and 16". At the underside of the transferring means 17 the towing machines 18 are disposed.

Now the operation of the second embodiment of the invention will be described.

Clay is extruded from the deairing machine A into the form of a clay column 1 of a predetermined length, which is then fed to the table 3. Next, the clay column 1 is transferred by a conveyor 4 and is sliced by the cutter B to rolls of clay of a predetermined length. The rolls of clay 1' so cut are fed onto disks 7' which is elevated from the conveyor 8' stopped. Then, by means of the conveyor 8' the rolls of clay 1' on the disks 7' are transferred to the station C', where the rolls of clay 1' are spread to the bats 1" over the disks 7' by the spreading tools 5.

In the point where the conveyor 8' turns back, the bats 1" are stripped off by the cutters 6 and drops from the downwardly facing disks 7'. The bats 1" so dropped are received by the molds 7" on the stopped conveyor 8" and are sent to the forming station C", where the bats 1" are formed over the molds 7" by the former tools 9 into the form of greenwares. Next, the greenwares 1" are transferred by the conveyor 8" into the first dryer 10 for drying. Greenwares coming out of the first dryer 10 are picked up by the suction means 15, transferred by the carriage 14 toward the conveyor 13, and are placed on the ring-shaped seats 12 on the conveyor 13 stopped. As the conveyor 13 advances, the greenwares 1" are transferred into the second dryer 11 and are dried therein. Since the seats 12 are ringed in shape, the greenwares 1" are thoroughly dried from both outer and inner sides. The greenwares 1" coming out of the second dryer 11 are picked up by sucking means 16, turned upside down, and are placed on the potter's wheel 18 by sucking means 16', mounted on the transferring means 17. Then, the greenwares 1" are finished on the potter's wheel 18, transferred to the piling station 19 by sucking mean 16", and piled up there as finished greenwares.

Figure 11:
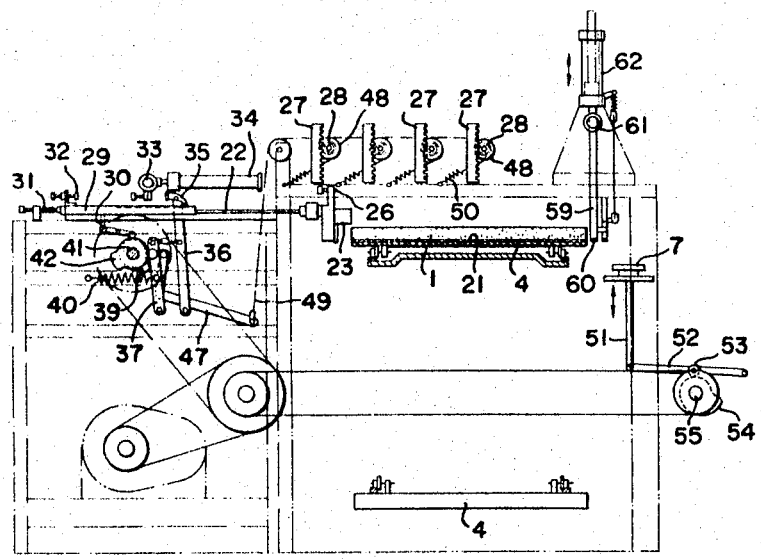
FIG. 11 is a side elevation of a multi-head type clay extruding and cutting device.
Figure 12:
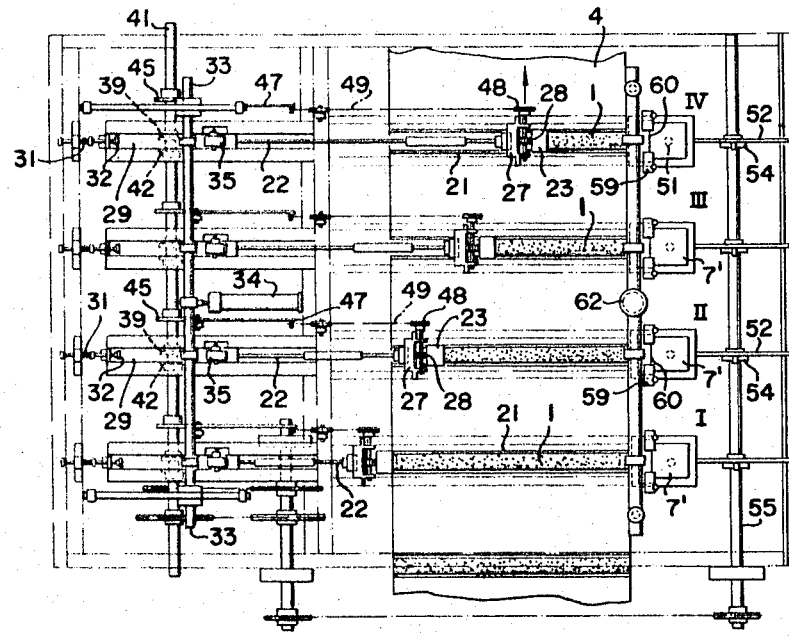
FIG. 12 is a plan view of the above device.
Figure 13:
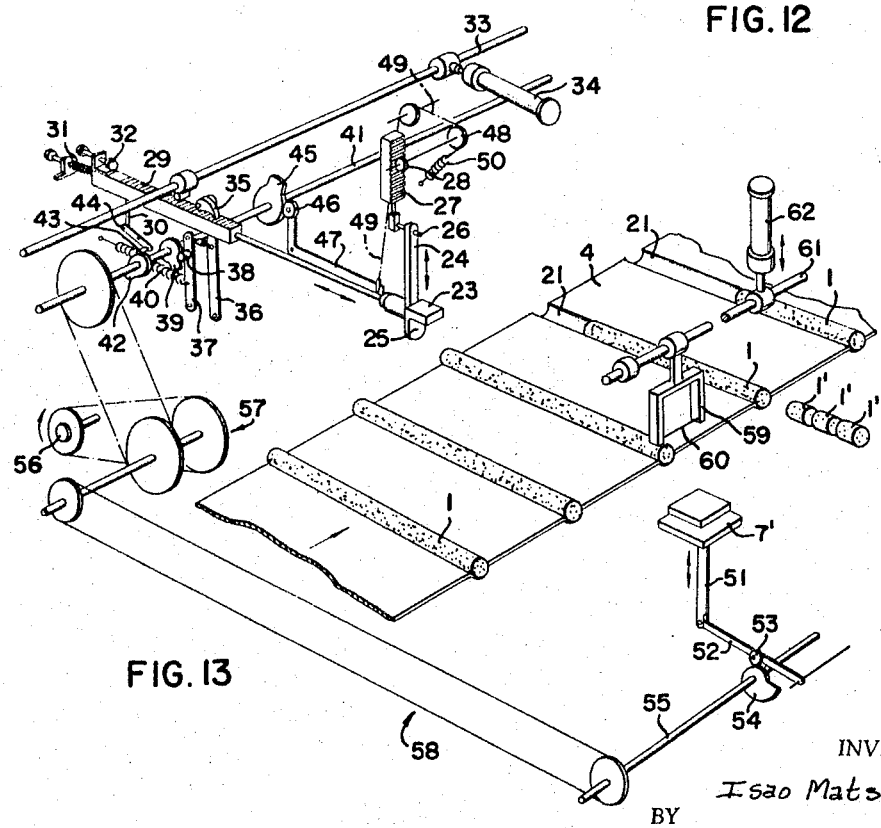
FIG. 13 is a perspective view of a part of the above device.

Next, a multi-head clay cutting device B embodying the present invention will be described by reference to FIGS. 11 through 13.

On the conveyor 4, a plurality of troughs 21 capable of receiving clay columns 1 are provided parallelly and equidistantly at right angles to the axis of the conveyor.

On the side of the conveyor 4, a plural of plates 7' are arranged at intervals equal to those of the troughs 21. In the embodiment shown in FIGS. 11 and 12, four disks 7 ', i.e. I, II, III, and IV, are arranged sidewise. In FIG. 13 there is shown only one of the disks 7' by way of simplification and the rest of disks 7' are omitted. The disk 7' may be replaced by the mold 7 of the first embodiment.

On the other side of the conveyor 4 and in positions opposite to the rows I, II, III, and IV, sliding rods 22 are arranged parallelly in the axial direction of the troughs 21. For convenience of explanation only one sliding rod 22 and related parts are shown in FIG. 13, with the omission of other rods and related parts.

Each sliding rod 22 is provided at its front end with a head 23, which has an upright rod 24 thereon and a jaw 25 which hangs downward opposite to the conveyor 4. The top end of the upright rod 24 is connected by way of a pin 26 to a vertical rack 27 which is in mesh with a pinion 28.

The sliding rod 22 has ratchet teeth 29 on the rear upper face and a stopper pin 30 on the lower part. The stopper pin 30 engages at its top end with the sliding rod 22. A spring 31 is provided behind the sliding rod 22 and it is in contact with the sliding rod 22 in such manner as to push the latter forward. Above the rear end of the sliding rod 22, there is provided a receiver 32, and a horizontal rod 33 which can contact the front side of the receiver 32 is arranged parallelly with the conveyor 4. The horizontal rod 33 can contact all of the receivers 32, and is linked to an air cylinder 34 which operates to push it back.

The pawl 35 to engage with the ratchet teeth 29 is pivotally connected to the top end of a lever 36. The lever 36 and another lever 37 which cooperates therewith are pivoted at their lower ends to the lower portion of the sliding rod 22. A cam roller 38 provided on the upper portion of the lever 37 engages with the cam face of a cam 39, and a spring 40 is stretched between the lower portion of the lever 37 and a suitable fixing point. The cam 39 is mounted on a horizontal spindle 41 which is disposed in parallel with the conveyor 4.

A cam 42 is fitted to the horizontal spindle 41 and the cam face engages with a cam roller 43. The cam roller 43 and the stopper pin 30 are connected together by a lever means 44.

Another cam 45 is fitted to the horizontal spindle 41 and the cam face engages with a roller 46 which is secured to one end of a lever means 47.

On the arbor of the pinion 28 rolls 48 are provided, by way of which a wire 49 linked with a spring 50 is stretched between a suitable fixed point and the other end of the lever means 47.

On the bottom of each disk 7', the top end of a push-up rod 51 is connected, and the lower end of the rod 51 is connected to a lever 52. A roller 53 mounted on the lever 52 contacts with the cam face of a cam 54 which is mounted to a horizontal spindle 55. The horizontal spindles 41 and 55 are both driven by a common driving shaft 56 by way of belt means 57, 58, at equal speeds.

In the neighborhood of one side of the conveyor 4 above each disk 7' a moving frame 59 is disposed which is open downwardly and has at its lower end a horizontal wire 60 stretched parallelly with the conveyor 4.

Each moving frame 59 is mounted at its top end to a horizontal rod 61 connected to an air cylinder 62 which operates in the vertical direction.

Next, the operation of the clay cutter B will be explained.

A clay column 1 fed from the table 3 onto the conveyor 4 is received by each trough 21 on the conveyor 4 and is transferred. When the column 1 has reached the row I, the conveyor 4 stops. At this time, the lever 47 is operated through the roller 46 by the cam face of cam 45 rotating on the spindle 41, and the wire 49 is pulled. Accordingly, by the pull of wire 49, the pinion 28 rotates, the rack 27 descends, and the head 23 also is urged downward by the pin 26. By the cam face of cam 42 rotating on the spindle 41, the lever means 44 is driven by the cam roller 43. Thus, the sliding rod 22 is disengaged with the stopper pin 30 and is pushed forward by the force of spring 31, while the jaw 25 of head 23 stops in contact with the rear end of the clay column 1. Next, by the cam face of cam 39 mounting on the spindle 41, the levers 37, 36 are operated, and the sliding rod 22 advances by a certain amount or by the stroke of the lever 36, through the pawl 35 and ratchet teeth 29 in engagement therewith. Accordingly, the clay column 1 is pushed out of the trough 21 by that amount. By the following revolution of the cam 39 the lever 37 is returned to the initial position by the force of spring 40.

On the other hand, the push-up rod 51 is elevated by the lever means 52 by the cam face of cam 54 which revolves on the spindle 55. Each disk 7' is positioned under the extruded clay column 1. As compressed air is introduced into the air cylinder 62, each moving frame 59 is brought down until the wire 60 cuts the clay column 1 to a roll of clay of a predetermined amount. Each roll of clay 1' is placed on the disk 7', and the push-up rod 51 descends as the cam 54 goes through the next revolution. Then, the disks 7' are mounted on the conveyor 8 and are transferred. By the introduction of compressed air in the reverse direction, the air cylinder 62 brings the moving frames back to their initial positions.

As the air cylinder 34 operates, the horizontal rod 33 engages with the receiver 32, by which the sliding rod 22 recedes and is stopped by the stopper pin 30. Then, the air cylinder 34 is returned reversely to the initial position.

The head 23 of sliding rod 22 is urged upward by the force of spring 50 through the wire 49, pinion 28, rack 27 and the like. At the same time, the conveyor 4 advances a distance equal to a pitch of troughs 21, thus bringing the clay column 1 in the row I to the next row II. The clay column 1 is sliced to predetermined amounts in the row II by the means as above described, and the rolls of clay 1' so sliced off are fed on the disks 7' positioned in the row II. Through the repetition of the above procedure, the clay column 1 is sliced to predetermined amounts successively in the rows I, II, III, and IV. Accordingly, on the molds positioned in the rows I, II, III, and IV. Accordingly, on the molds, positioned in the rows I, II, III, and IV, rolls of clay 1' are fed simultaneously, and the rolls of clay 1' in these rows are parallelly transferred on the conveyor 8 or 8'.

What is claimed is:

1. A continuous pottery forming machine of tablewares comprising means for mixing, deairing, and extruding material clay into cylindrical form, means for cutting the extruded clay into clay columns of a predetermined length, first conveying means for intermittently receiving and transferring the clay columns, means for simultaneously slicing a plurality of the clay columns into rolls of clay of a predetermined length, second conveying means for receiving and transferring plural rows of the rolls of clay, means disposed above the second conveying means for simultaneously forming the rolls of clay into greenwares, and means for drying the greenwares.

2. A continuous pottery forming machine of tablewares comprising a deairing machine for mixing, kneading, deairing, and extruding material clay into a cylindrical form, first conveying means for transferring the extruded clay columns, means for cutting the clay columns to rolls of clay of a predetermined length, second conveying means for transferring the rolls of clay, means disposed above the second conveying means for spreading the rolls of clay to the bats, third conveying means for receiving and transferring the spreaded bats, means disposed above the third conveying means for forming the spread bats into the greenware, first drying means for primarily drying the greenwares, fourth conveying means having ring-shaped seats for receiving the primarily dried greenwares and for transferring the same, second drying means for secondarily drying the greenwares on the ring shaped seats, means disposed above the fourth conveying means for sucking and revolving the secondary dried greenwares; fifth conveying means disposed over the sucking and revolving means for sucking and transferring the greenwares, the finishing means disposed under the fifth conveying means and means for piling the finished greenwares.

3. The machine as recited in claim 2 wherein said first conveying means intermittently receives and slices a plurality of the clay columns and wherein said second conveying means receives and transfers plural rows of the rolls of clay.

References Cited

UNITED STATES PATENTS

| 2,547,294 | 4/1951 | Wahl | 25—22 |
| 3,199,164 | 8/1965 | Emmel et al. | 25—2 |
| 3,363,779 | 1/1968 | Matsushima. | |

J. SPENCER OVERHOLSER, Primary Examiner

R. D. BALDWIN, Assistant Examiner

U.S. Cl. X.R.

25—22

UNITED STATES PATENT OFFICE
CERTIFICATE OF CORRECTION

Patent No. 3,462,810                                                 August 26, 1969

Isao Matsushima

It is certified that error appears in the above identified patent and that said Letters Patent are hereby corrected as shown below:

Column 1, line 19, "edge-toward" should read -- edge-towed --; line 18, "former tools" should read -- forming tools --. Column 2, line 57, "former tools" should read -- forming tools --. Column 3, lines 9, 38 and 75, "former tools", each occurrence, should read -- forming tools --.

Signed and sealed this 24th day of February 1970.

(SEAL)
Attest:

Edward M. Fletcher, Jr.                          WILLIAM E. SCHUYLER, JR.
Attesting Officer                                         Commissioner of Patents